(12) United States Patent
Liao

(10) Patent No.: US 6,510,770 B1
(45) Date of Patent: Jan. 28, 2003

(54) WOOD-TURNING LATHE

(76) Inventor: Juei-Seng Liao, No. 295, Sec. 1, Nanking E. Rd., Tung Dist., Taichung City (TW)

( * ) Notice: Subject to any disclaimer, the term of this patent is extended or adjusted under 35 U.S.C. 154(b) by 0 days.

(21) Appl. No.: 09/962,880

(22) Filed: Sep. 25, 2001

(30) Foreign Application Priority Data

Aug. 21, 2001 (TW) .................................. 90214278 U

(51) Int. Cl.$^7$ .......................... B27C 7/02; B23B 25/06; B23Q 16/06
(52) U.S. Cl. .......................... 82/142; 82/117; 82/156; 142/1; 142/55; 74/813 L
(58) Field of Search .......................... 82/117, 142, 156, 82/152; 142/1, 55; 74/813 R, 813 L; 408/89, 90; 409/221–223; 279/5

(56) References Cited

U.S. PATENT DOCUMENTS

| | | | |
|---|---|---|---|
| 938,030 A | * 10/1909 | White et al. | .................. 82/142 |
| 2,043,947 A | * 6/1936 | Blanchard | .................... 82/142 |
| 2,700,912 A | * 2/1955 | Hardy | .......................... 82/152 |
| 5,878,638 A | * 3/1999 | Wang | ........................... 82/142 |

FOREIGN PATENT DOCUMENTS

GB     2187124-Q A  * 9/1987  .................... 142/1

* cited by examiner

Primary Examiner—Steven C. Bishop
(74) Attorney, Agent, or Firm—Webb, Ziesenhiem Logsdon Orkin & Hanson, P.C.

(57) ABSTRACT

A wood-turning lathe includes a driven shaft mounted with a pulley unit having a plurality of angularly spaced retaining holes, a spring-biased pin and a cam member associated with both the pin and the pulley unit. When the cam member is moved to a locking position, the pin is urged by the cam member to engage a selected one of the retaining holes in the pulley unit to immobilize the pulley unit. When the cam member is moved to an unlocking position, the pin disengages from the selected one of the retaining holes in the pulley unit to permit rotation of the pulley unit.

4 Claims, 10 Drawing Sheets

WOOD-TURNING LATHE

CROSS-REFERENCE TO RELATED APPLICATION

This application claims priority of Taiwan Application No. 90214278, filed on Aug. 21, 2001.

BACKGROUND OF THE INVENTION

1. Field of the Invention

The present invention relates to a wood-turning lathe, more particularly to a wood-turning lathe which is provided with an angular adjusting device for a driven shaft.

2. Description of the Related Art

Referring to FIG. 1, a conventional wood-turning lathe is shown to include a lathe bed 20, a headstock 21, a tail-stock (not shown), and a tool rest 24 between the headstock 21 and the tail-stock. The headstock 21, the tail-stock, and the tool rest 24 are mounted on the bed 20. The headstock 21 includes a headstock body 120 having a shaft 22 that is rotated by a motor (not shown), and that has a right clamping end 22' extending outwardly from a right side of the headstock body 210 for holding one end of the woodpiece (not shown) to be turned. The tail-stock holds the other end of the woodpiece (not shown), allowing the latter to rotate freely. A chisel (not shown) is fixed on the tool rest 24 for shaping and cutting the woodpiece (not shown) during rotation of the latter. The headstock 21 further has a pulley unit (not visible) which is disposed inboard to a left side of the headstock body 210 and which is fixed on a left output end of the shaft 22. The pulley unit is formed with a plurality of circumferentially and angularly spaced retaining holes. The left side of the headstock body 210 is formed with a plurality of through holes 212 respectively registered with the retaining holes in the pulley unit in such a manner that after an angular adjustment of the shaft 22 relative to an index, a locking pin 23 can be inserted into a selected one of the retaining holes in the pulley unit and a corresponding one of the through holes 212 in the headstock body 210, thereby immobilizing the pulley unit relative to the headstock body 210. Under this condition, inscription or engraving can be done on an outer surface of the woodpiece using the chisel.

It is inconvenient for the user to insert the locking pin 23 into the headstock body 210 and the pulley unit. In addition, the locking pin 23 may be displaced since it is separately formed from the headstock body 210.

SUMMARY OF THE INVENTION

Therefore, the object of this invention is to provide a wood-turning lathe which includes an angular adjusting device for changing an angular position of a driven shaft with respect to a reference point and which is capable of immobilizing the driven shaft so as to avoid occurrence of the aforesaid disadvantages that result from the use of the conventional wood-turning lathe.

Accordingly, a wood-turning lathe of the present invention includes a lathe bed, a headstock, a tail-stock, and a tool rest between the headstock and the tail-stock. The headstock, the tail-stock and the tool rest are mounted on the lathe bed. The headstock includes a headstock body, a driven shaft, a drive shaft, first and second pulley units, a non-elastic belt, and an angular adjusting device for the driven shaft. The headstock body has a left side. The driven shaft is journalled to the headstock body, and has an output end extending outwardly from the left side of the headstock body. The drive shaft is journalled to the headstock body, and is vertically spaced apart from and extends parallel to the driven shaft. The drive shaft has a coupling end extending outwardly from the left side of the headstock body. The first and second pulley units are mounted respectively on the coupling end of the drive shaft and the output end of the driven shaft. One of the first and second pulley units has a side surface formed with a plurality of circumferentially and angularly spaced retaining holes. The non-elastic belt interconnects the first and second pulley units such that rotation of the drive shaft results in synchronous rotation of the first and second pulley units. The angular adjusting device includes a cam member and a cam follower. The cam member is mounted movably on the headstock body and defines a cam face. The cam member is movable between a locking position and an unlocking position. The cam follower is in the form of a spring-biased pin, and is disposed between the side surface of said one of the first and second pulley units and the cam member. The cam follower is urged to slidably contact the cam face such that when the cam member moves to the locking position, the pin is pushed by the cam face against biasing force thereof so as to engage the pin with a selected one of the retaining holes in said one of the first and second pulley units, thereby immobilizing the first and second pulley units. Under this condition, inscription or engraving can be done on an outer surface of a woodpiece which is held between the driven shaft and the tail stock. When the cam member moves to the unlocking position, the pin disengages from the selected one of the retaining holes in said one of the first and second pulley units, thereby permitting synchronous rotation of the first and second pulley units.

After angular adjustment of the driven shaft, a mere shifting of the cam member to the locking position results in immobilization of the driven shaft relative to the headstock body, thereby facilitating the user of the wood-turning lathe of the present invention. In addition, misplacement of components of the angular adjusting device, which occurs in the conventional wood-turning lathe, can be avoided.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
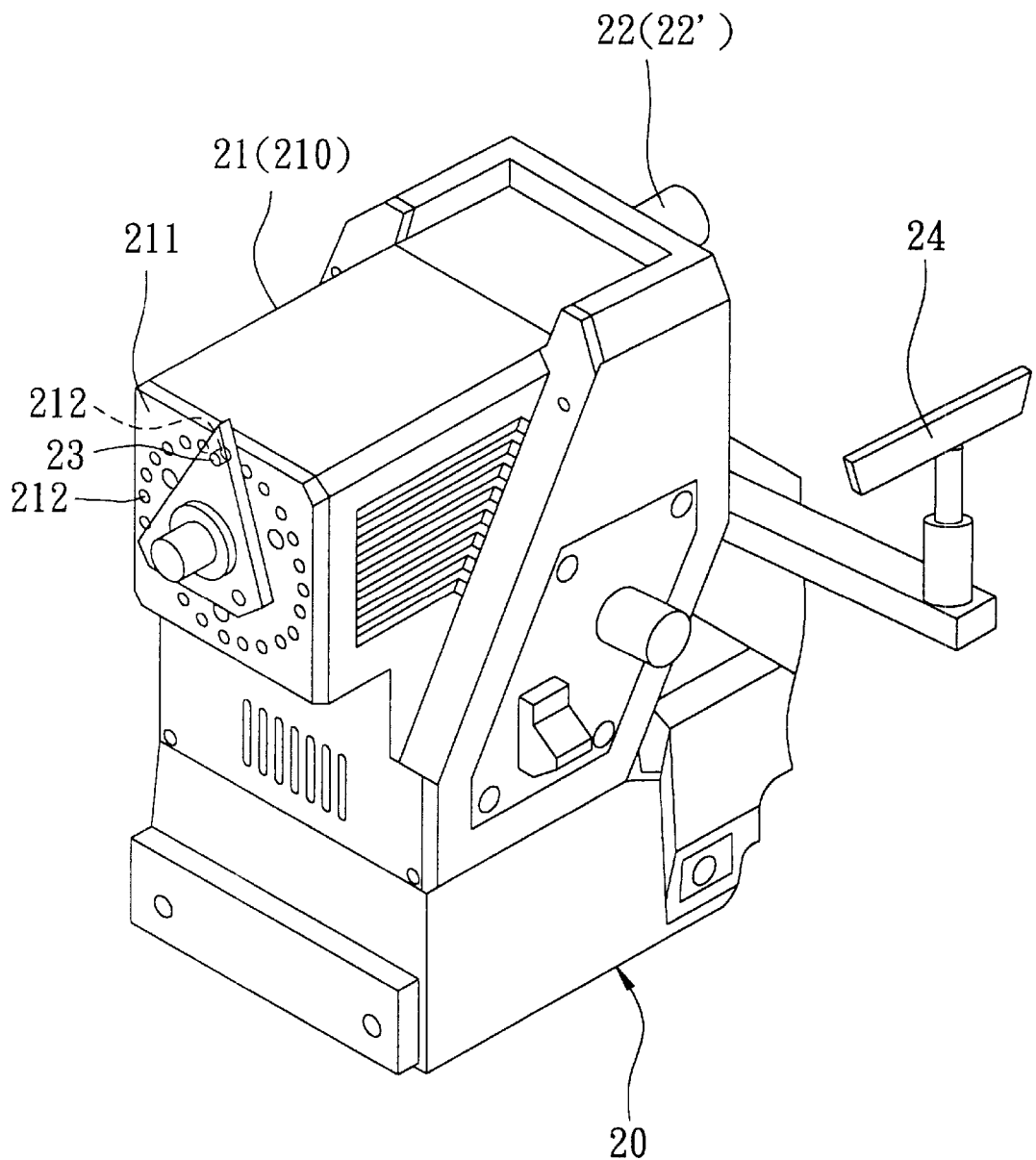
FIG. 1 is a perspective view of a conventional wood-turning lathe.
Figure 2:
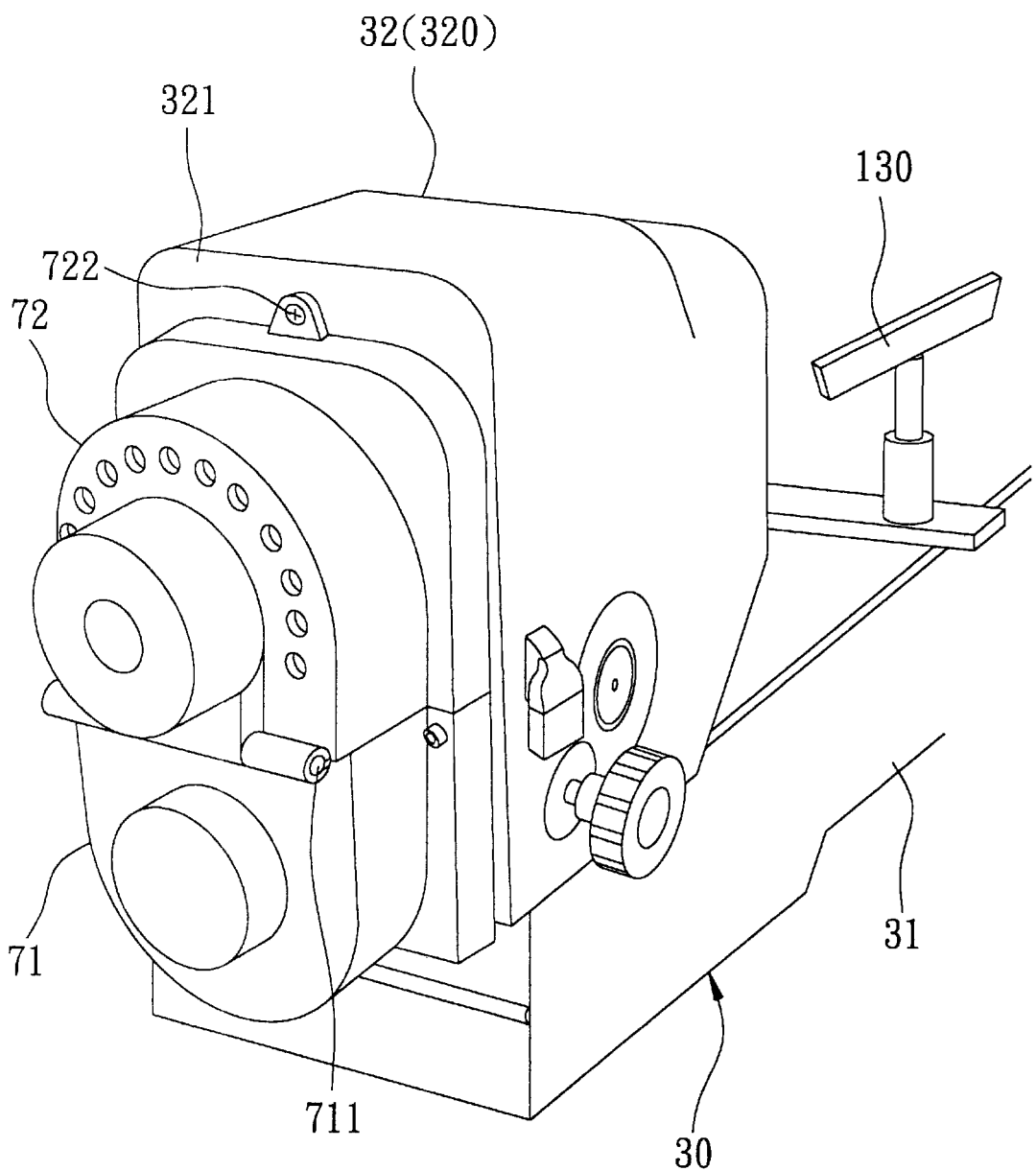
FIG. 2 is a perspective view of a preferred embodiment of a wood-turning lathe according to the present invention.

Referring to FIGS. 2 to 5, the preferred embodiment of a wood-turning lathe according to the present invention is shown to include a lathe bed 31, a headstock 32, a tail-stock (not shown), and a tool rest 130 between the headstock 32 and the tail-stock.

The headstock 32, the tail-stock and the tool rest 130 are mounted on the lathe bed 31. The present invention is related to improvements upon the headstock 32, which includes a headstock body 320, a driven shaft 33, a drive shaft 34, first and second pulley units 36,37, a non-elastic belt 38, and an angular adjusting device 35 for the driven shaft 33.

As illustrated, the headstock body 320 has a left side 321.

The driven shaft 33 is journalled to the headstock body 320, and has an output end 33' extending outwardly from the left side 321 of the headstock body 320.

The drive shaft 34 is journalled to the headstock body 320, and is vertically spaced apart from and extends parallel to the driven shaft 33. A coupling end 34' of the drive shaft 34 extends outwardly from the left side 321 of the headstock body 320.

The first and second pulley units 36,37 are mounted respectively on the coupling end 34' of the drive shaft 34 and the output end 33' of the driven shaft 33. The second pulley unit 37 has a side surface 3723 formed with a plurality of circumferentially and angularly spaced retaining holes 3724. Preferably, the retaining holes 3724 on the side surface 3723 of the second pulley unit 37 are uniformly spaced from one another at 15 degrees relative to a center point of the second pulley unit 37.

The non-elastic belt 38 interconnects the first and second pulley units 36,37 such that rotation of the drive shaft 34 results in synchronous rotation of the first and second pulley units 36,37. Each of the first and second pulley units 36, 37 has a fixed pulley 362,372 and a movable pulley 361,371 between which a belt receiving space is defined to receive the non-elastic belt 38 therein. The fixed pulley 372 has a co-axially extending sleeve 3721 mounted securely on the driven shaft 33 by means of key-and-groove engagement. In this embodiment, the retaining holes 3724 are formed in an inner side surface 3723 of the fixed pulley 372. An urging member is provided to urge the movable pulley 371 toward the fixed pulley 372. A control unit is mounted on the headstock body 320, has an operable knob 75 exposed from the headstock body 320, and is operably associated with the second pulley unit 37 for manual rotation of the same in order to vary the angular position of the second pulley unit 37. A measuring scale 80 is fixed on the fixed pulley 372 to facilitate angular adjustment of the second pulley unit 37. Since the features of the present invention do not reside in the exact configuration of the first and second pulley units 36,37, a detailed disclosure of the same will be omitted herein for the sake of brevity.

Figure 6:
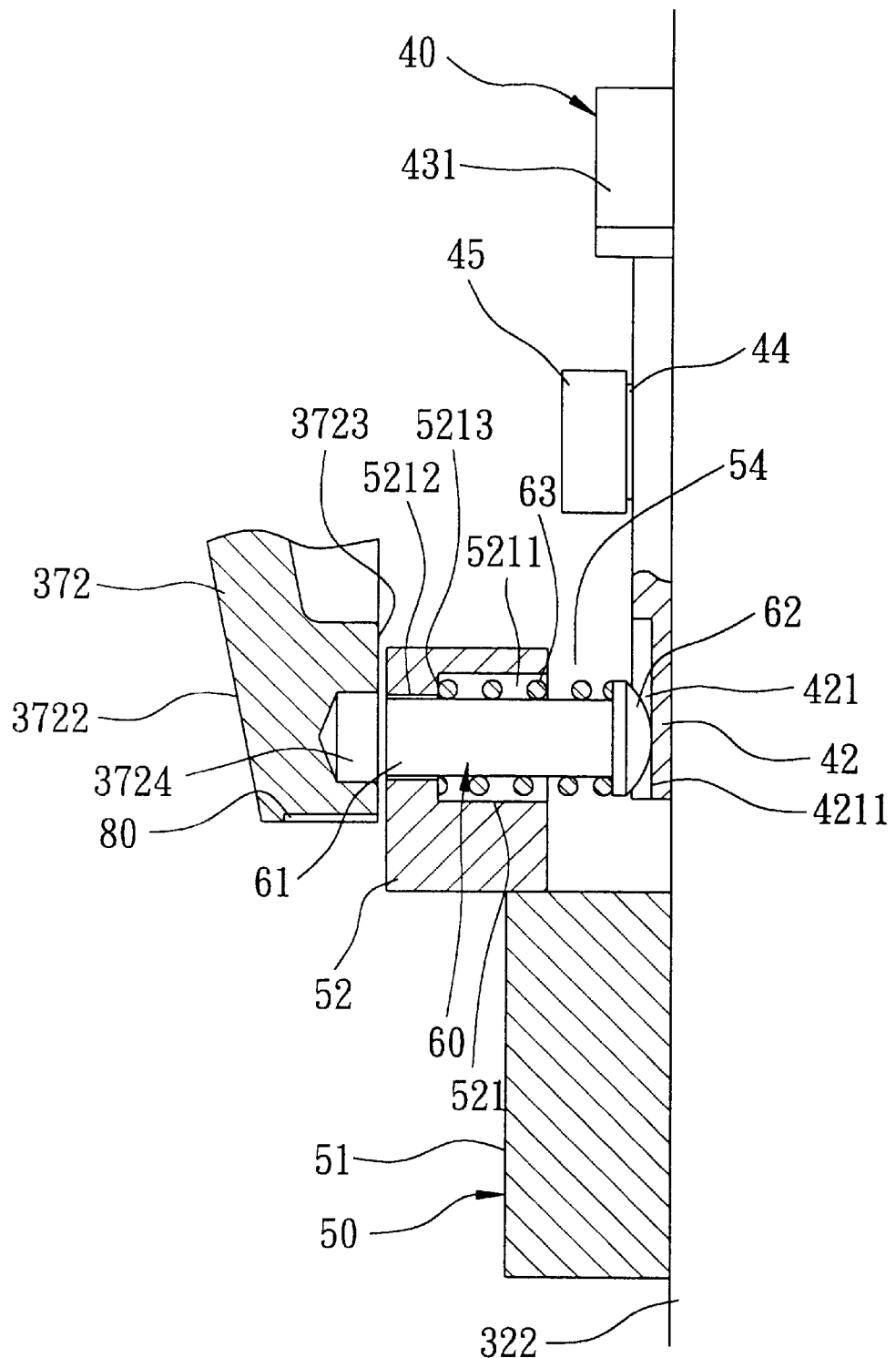
FIGS. 6 and 7 are fragmentary partly sectional schematic side views of the preferred embodiment shown in FIG. 5, in which the driven shaft can rotate due to movement of the cam member to the unlocking position.
Figure 7:
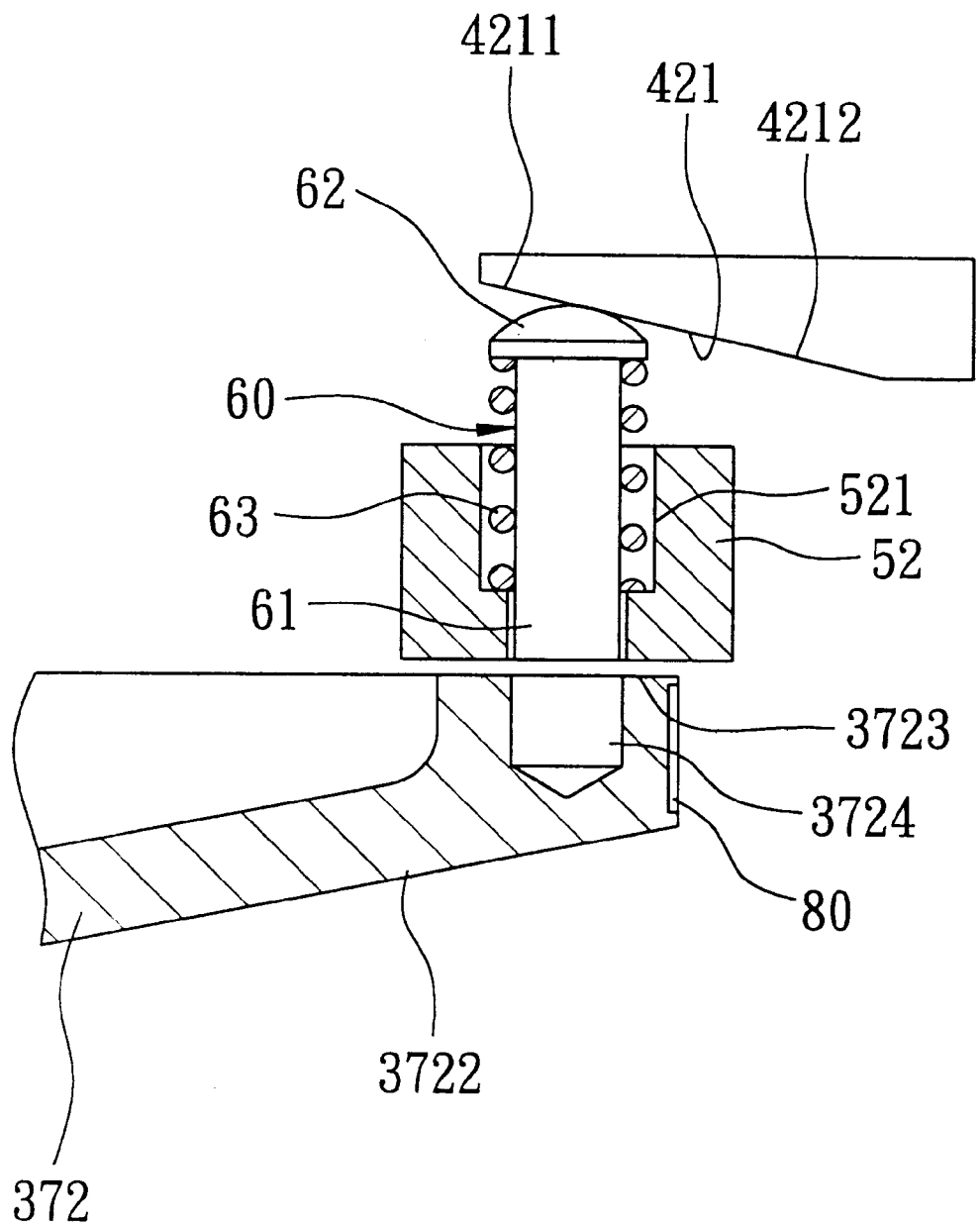
Figure 8:
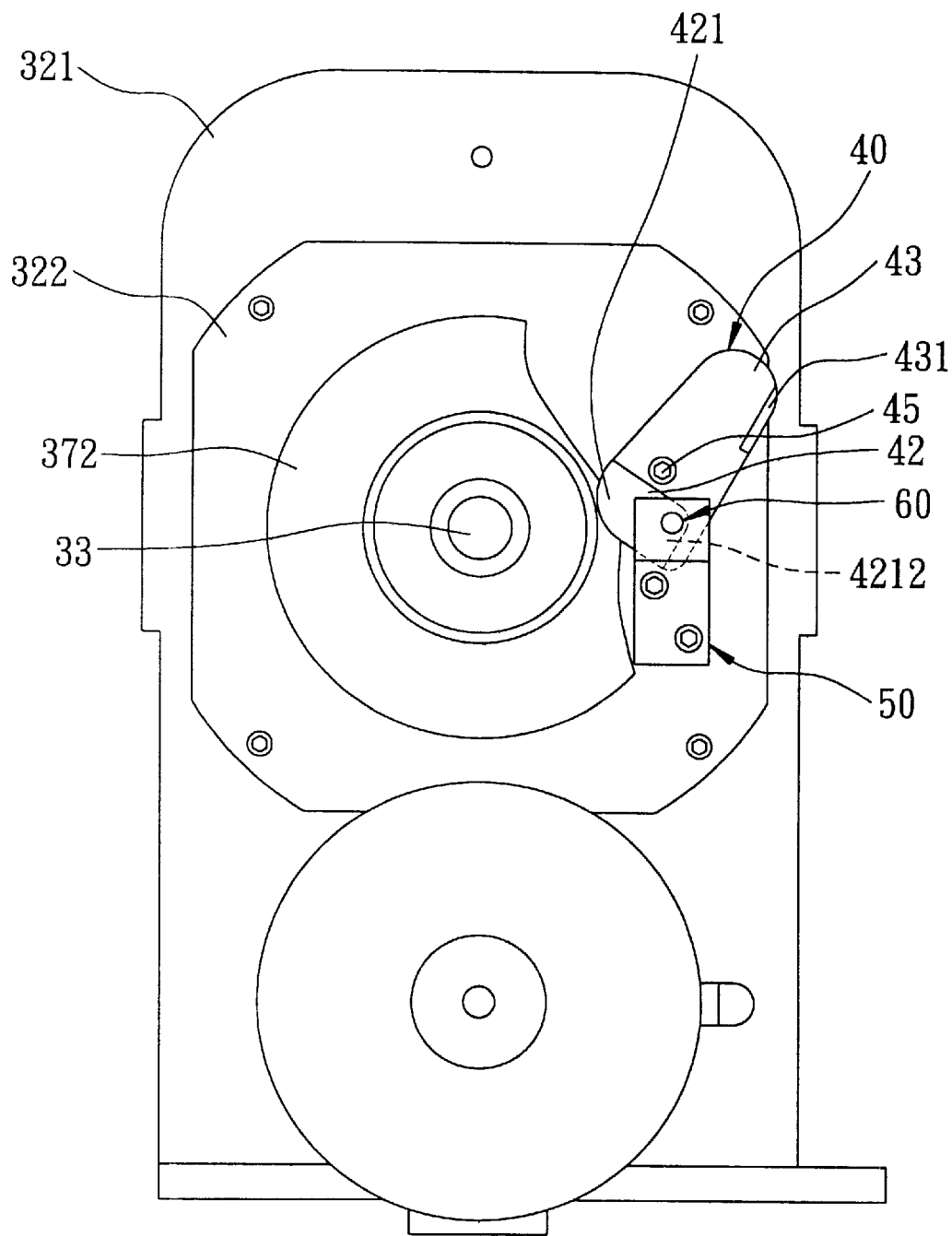
FIG. 8 is a schematic front view illustrating a position of the preferred embodiment, in which the driven shaft of the preferred embodiment cannot rotate due to movement of the cam member to a locking position.
Figure 9:
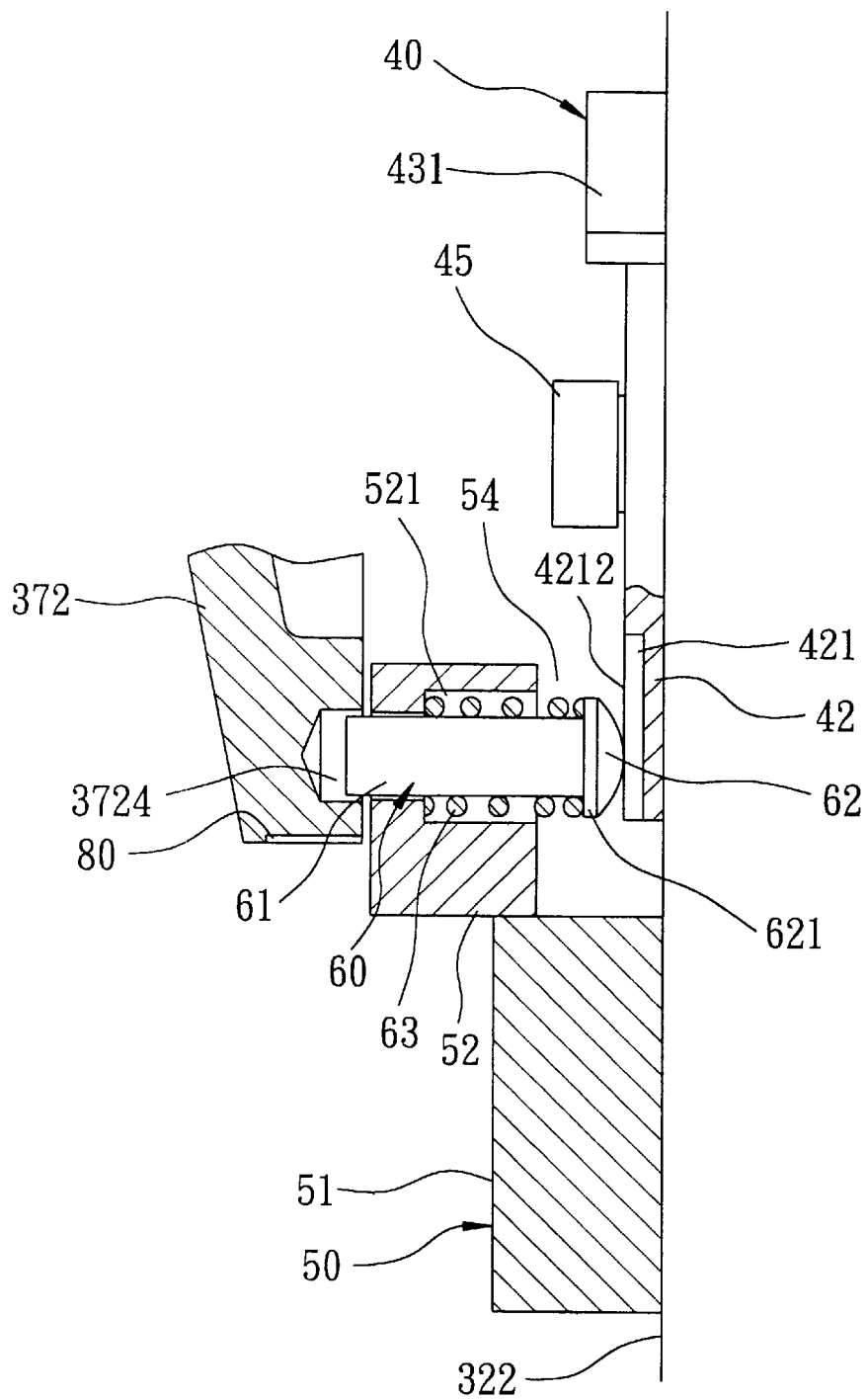
FIGS. 9 and 10 are fragmentary partly sectional schematic side views of the preferred embodiment shown in FIG. 8, in which the driven shaft cannot rotate due to movement of the cam member to the locking position.
Figure 10:
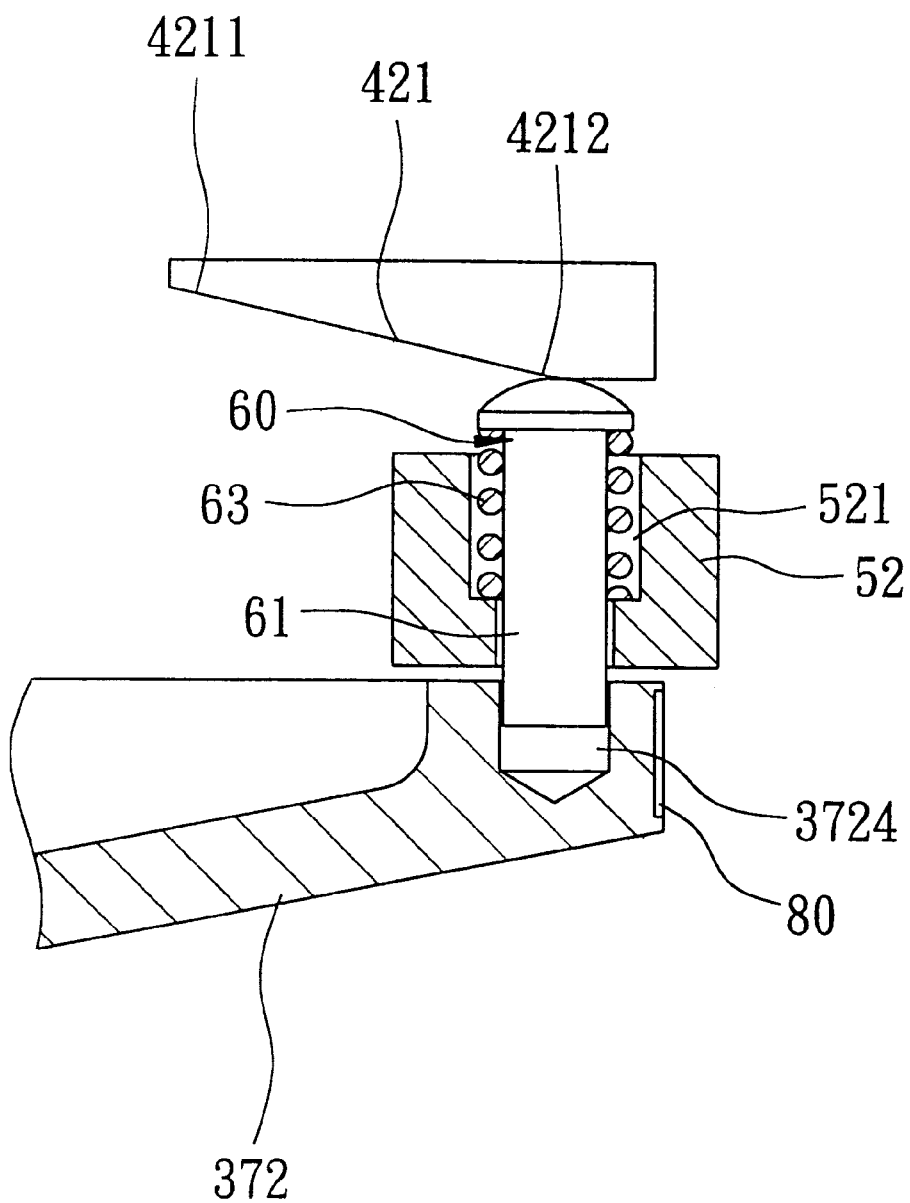

The angular adjusting device 35 includes a cam member 40 and a cam follower which is in the form of a spring-biased pin 60. The cam member 40 is mounted movably on the headstock body 320, defines a cam face 421, and is movable between a locking position and an unlocking position relative to the driven shaft 33. The pin 60 is disposed between the side surface 3723 of the second pulley unit 37 and the cam member 40, and is urged in such a manner that a headed end 62 of the pin 60 slidably contacts the cam face 421 of the cam member 40 such that when the cam member 40 is moved to the locking position, the pin 60 is pushed by the cam face 421 against biasing force thereof so as to engage a distal end 61 of the pin 60 with a selected one of the retaining holes 3724 in the second pulley unit 37, as best shown in FIGS. 8, 9 and 10, thereby immobilizing the first and second pulley units 36,37. When the cam member 40 is moved to the non-locking position, the distal end 61 of the pin 60 disengages from the selected one of the retaining holes 3724 in the second pulley unit 37, as best shown in FIGS. 6, 7 and 8, thereby permitting synchronous rotation of the first and second pulley units 36,37.

Preferably, a pivot 45 extends through the cam member 40 and is horizontally and parallelly spaced from the driven shaft 33 such that the cam member 40 is turnable about the pivot 45 between the locking and unlocking positions. The cam member 40 has a lower portion 42 which defines the cam face 421 thereon and which has a proximate side 4211 proximate to the driven shaft 33, and a distal side 4212 distal from the driven shaft 33. The cam surface 421 gradually inclines from the proximate side 4211 toward the distal side 4212 such that when the cam member 40 turns between the locking and unlocking positions, the pin 60 moves in a transverse direction relative to the cam face 421 of the cam member 40, such that the pin 60 contacts the proximate side 4211 at the unlocking position, and such that the pin 60 contacts the distal side 4212 at the locking position. A hand-holding element 431 extends outwardly from an upper portion 43 of the cam member 40 to facilitate moving of the cam member 40 between the locking and unlocking positions.

Figure 4:
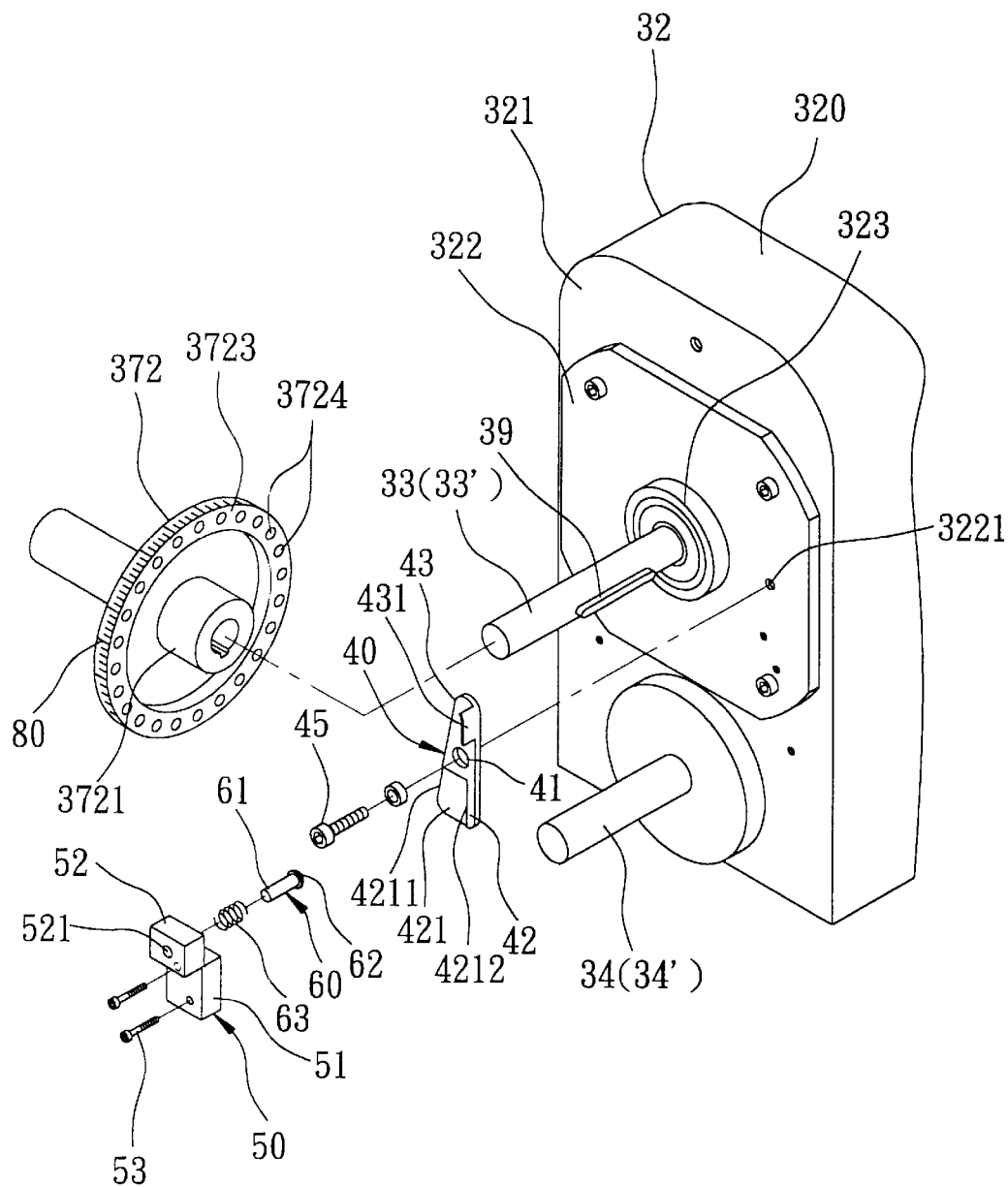
FIG. 4 is a partly exploded perspective view of the preferred embodiment.
Figure 5:
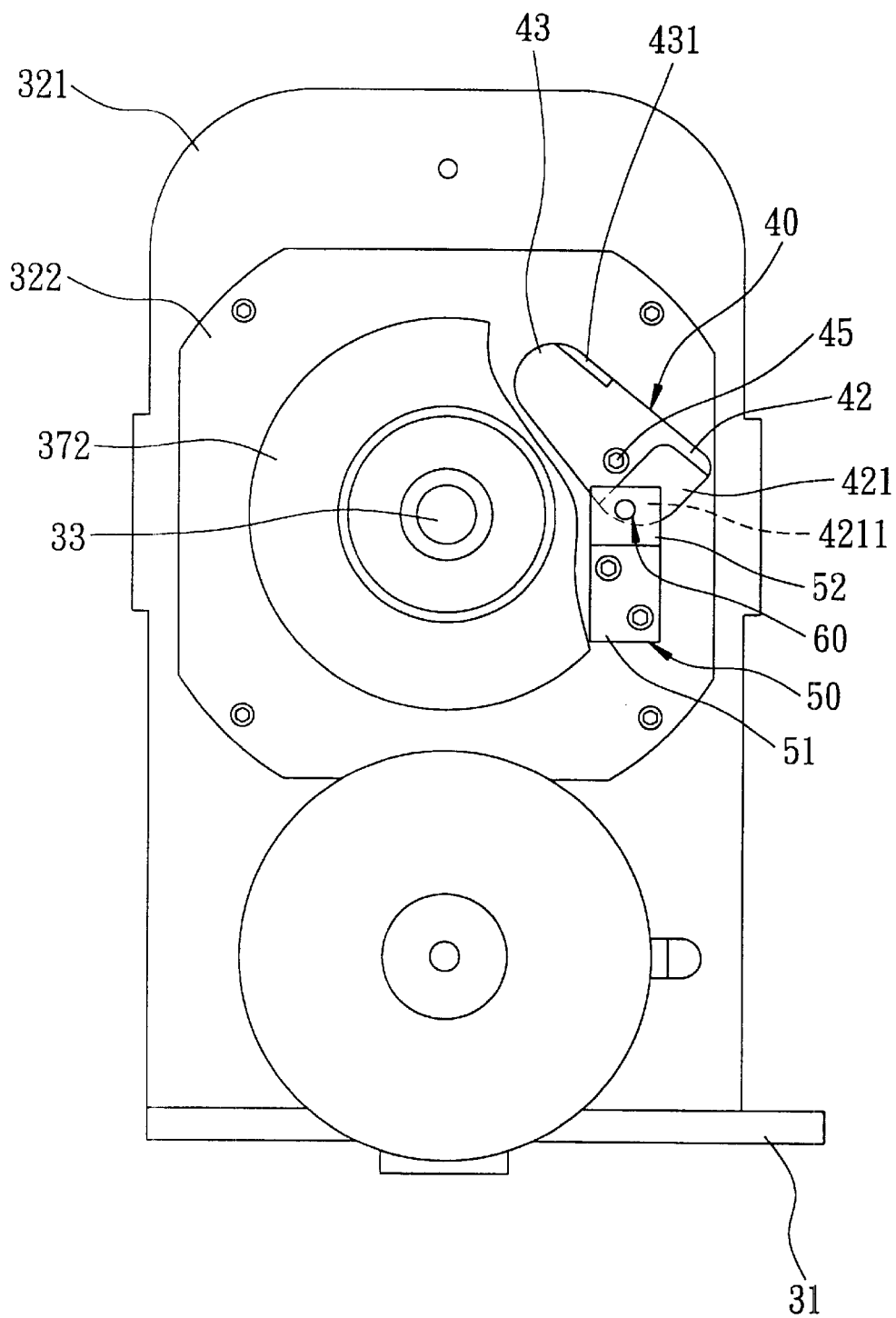
FIG. 5 is a schematic front view illustrating a position of the preferred embodiment, in which a driven shaft of the preferred embodiment can rotate due to movement of a cam member to an unlocking position.

A bearing-mounting seat 322 is fixed on the left side 321 of the headstock body 320 for holding two bearing units 323 (only one is shown in FIG. 4) via which the driven shaft 33 is journalled. The pivot 45 extends through a hole 41 in the cam member 40, and is threaded to a threaded hole 3221 in the bearing-mounting seat 322.

A pin-mounting seat 50 is disposed inboard to the second pulley unit 37, and is mounted on the bearing-mounting seat 322 via two screws 53 which extend through a lower portion 51 of the seat 50. An upper portion 52 of the seat 50 cooperates with the bearing-mounting seat 322 to define a cam-retention space 54 therebetween to receive the cam member 40 and the pin 60. The upper portion 52 of the seat 50 further defines a pin-extension hole 521 therethrough for passage of the pin 60. The pin-extension hole 521 has a narrow-diameter hole section 5212 distal from the bearing-mounting seat 322, and a large-diameter hole section 5211 which is proximate to the bearing-mounting seat 322 and which receives a spring member 63 and the pin 60 therein. The spring member 63 is sleeved on the pin 60 so as to urge the latter to sldiably contact the cam face 421 of the cam member 40, as best shown in FIG. 6.

In this preferred embodiment, a lower cover unit 71 is fixed to the headstock body 320 for concealing the first pulley unit 36 therein. An upper cover unit 72 is mounted pivotally to the lower cover unit 71 via a coupling pivot 711. The upper cover unit 72 is provided with a fastener bolt 722 which is adapted to be fastened detachably to a threaded hole 3211 that is formed in the left side 321 of the headstock body 320 for concealing the second pulley unit 37.

Figure 3:
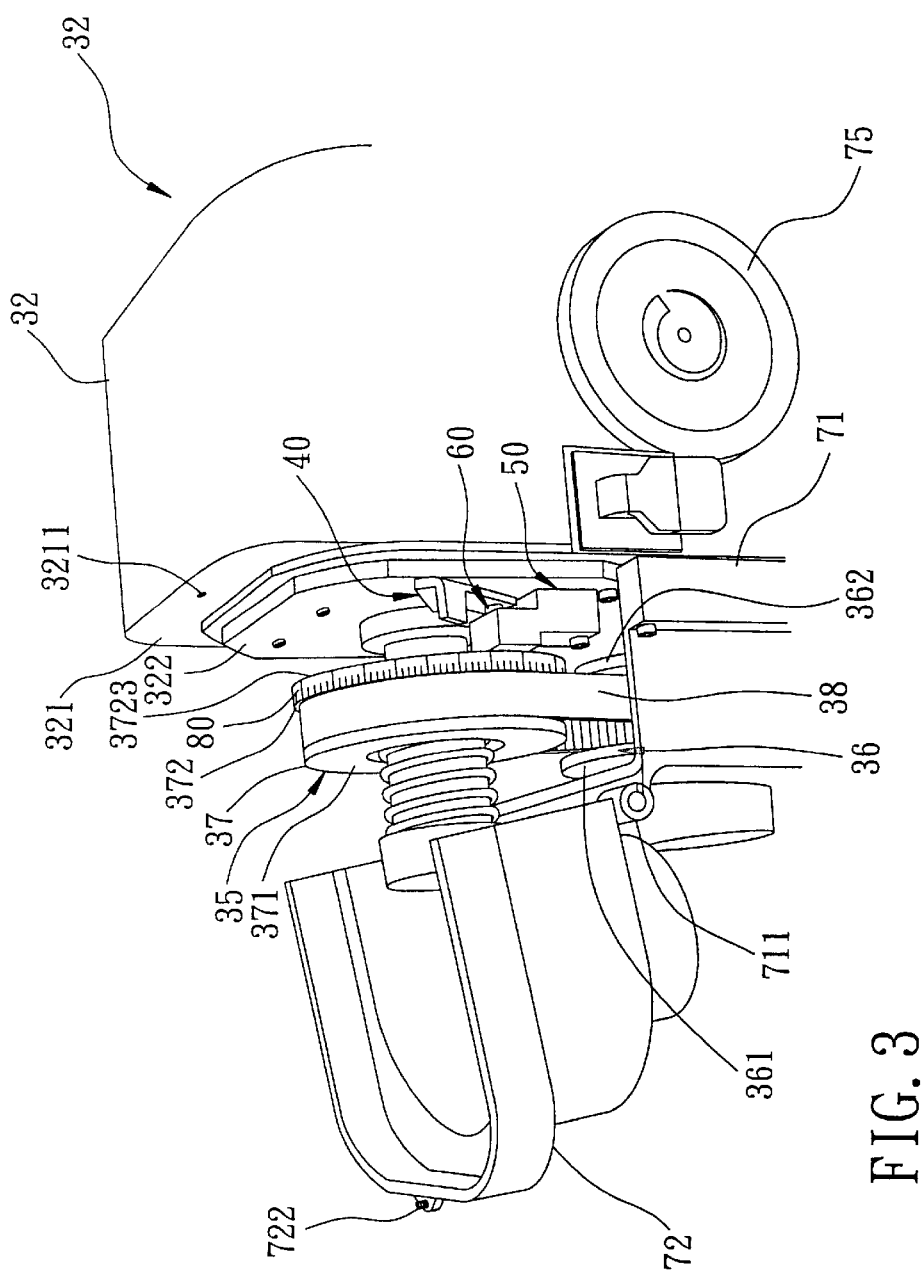
FIG. 3 is a fragmentary perspective view of the preferred embodiment shown in FIG. 2 with a cover unit partly open to illustrate an angular adjustment device employed therein.

As illustrated in FIGS. 3 and 8, when the cam member 40 is at the locking position, the cam member 40 can prevent closing of the upper cover unit 72 on the headstock body 320 by virtue of spanning action of the cam member 40 across a moving path of the upper cover unit 72 toward the headstock body 320.

With this invention thus explained, it is apparent that numerous modifications and variations can be made without departing from the scope and spirit of this invention. It is therefore intended that this invention be limited only as indicated in the appended claims.

I claim:

1. A wood-turning lathe including a bed, a headstock, a tail-stock, and a tool rest between said headstock and said tail-stock, said headstock, said tail-stock and said tool rest being mounted on said bed, wherein said headstock comprises:

a headstock body having a left side;

a driven shaft journalled to said headstock body, and having an output end extending outwardly from said left side of said headstock body;

a drive shaft journalled to said headstock body, and vertically spaced apart from and extending parallel to said driven shaft, said drive shaft having a coupling end extending outwardly from said left side of said headstock body;

first and second pulley units mounted respectively on said coupling end of said drive shaft and said output end of said driven shaft, one of said first and second pulley units having a side surface formed with a plurality of circumferentially and angularly spaced retaining holes;

a non-elastic belt interconnecting said first and second pulley units such that rotation of said drive shaft results in synchronous rotation of said first and second pulley units; and an angular adjusting device including a cam member mounted movably on said headstock body, defining a cam face, and movable between a locking position and an unlocking position, and a cam follower in the form of a spring-biased pin mounted on said headstock body and disposed between said side surface of said one of said first and second pulley units and said cam member, said cam follower being urged to slidably contact said cam face such that when said cam member moves to said locking position, said pin is pushed by said cam face against biasing force thereof so as to engage said pin with a selected one of said retaining holes in said one of said first and second pulley units, thereby immobilizing said first and second pulley units, and such that when said cam member moves to said non-locking position, said pin disengages from said selected one of said retaining holes in said one of said first and second pulley units, thereby permitting synchronous rotation of said first and second pulley units.

2. The wood-turning lathe as defined in claim 1, further comprising a pivot which extends parallel to and which is horizontally spaced from said drive shaft and which mounts said cam member on said headstock body so as to permit said cam member to be turnable about said pivot between said locking and unlocking positions.

3. The wood-turning lathe as defined in claim 2, wherein said cam face of said cam member is an inclined surface having a proximate side proximate to said driven shaft and a distal side distal from said driven shaft, said inclined surface gradually inclining from said proximate side toward said distal side so that when said cam member turns between said locking and unlocking positions, said pin moves in a transverse direction relative to said cam face of said cam member, so that said pin contacts said proximate side when said cam member is at said unlocking position, and so that said pin contacts said distal side when said cam member is at said locking position.

4. The wood-turning lathe as defined in claim 1, further comprising a spring member sleeved on said pin for urging said pin to slidably contact said cam face of said cam member, and a pin-mounting seat which is mounted on said headstock body to define a pin-extension hole for passage of said cam follower, said pin-extension hole defining a narrow-diameter hole section distal from said left side of said headstock body and a large-diameter hole section proximate to said left side of said headstock body to retain said spring member and said pin therein.

* * * * *